United States Patent
Suh et al.

(10) Patent No.: US 9,578,300 B2
(45) Date of Patent: Feb. 21, 2017

(54) METHOD AND APPARATUS FOR PROCESSING EDGE VIOLATION PHENOMENON IN MULTI-VIEW 3DTV SERVICE

(71) Applicant: LG Electronics Inc., Seoul (KR)

(72) Inventors: Jongyeul Suh, Seoul (KR); Jeehyun Choe, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 39 days.

(21) Appl. No.: 14/432,603

(22) PCT Filed: Oct. 25, 2013

(86) PCT No.: PCT/KR2013/009597
§ 371 (c)(1),
(2) Date: Mar. 31, 2015

(87) PCT Pub. No.: WO2014/065635
PCT Pub. Date: May 1, 2014

(65) Prior Publication Data
US 2015/0271464 A1    Sep. 24, 2015

Related U.S. Application Data

(60) Provisional application No. 61/718,681, filed on Oct. 25, 2012.

(51) Int. Cl.
*H04N 19/00*    (2014.01)
*H04N 13/00*    (2006.01)
(Continued)

(52) U.S. Cl.
CPC ...... *H04N 13/0022* (2013.01); *H04N 13/0007* (2013.01); *H04N 13/0018* (2013.01);
(Continued)

(58) Field of Classification Search
CPC .. H04N 19/597; H04N 19/70; H04N 13/0007; H04N 13/0066; H04N 21/43
(Continued)

(56) References Cited

U.S. PATENT DOCUMENTS

2009/0041336 A1    2/2009   Ku et al.
2011/0234760 A1*   9/2011   Yang .................. H04N 13/0048
                                                          348/46
(Continued)

FOREIGN PATENT DOCUMENTS

CN    102271275 A    12/2011
EP    2357823 A1    8/2011
(Continued)

OTHER PUBLICATIONS

International Search Report and Written Opinion from PCT/KR2013/009597, dated Jan. 29, 2014.
(Continued)

*Primary Examiner* — Jeffery Williams
(74) *Attorney, Agent, or Firm* — Dentons US LLP

(57) ABSTRACT

A method for receiving a 3D image broadcast signal for processing edge violation in a multi-view 3D image comprises the steps of: receiving a broadcast signal for broadcasting the multi-view 3D image; decoding from the received broadcast signal first left image data and first right image data which is included in a 3D image of a first view; parsing from the received broadcast signal 3D image processing information; generating second left image data and/or second right image data which is included in a 3D image of a second view, by using the first left image data, the first right image data, and the 3D image processing information; parsing 3D edge violation area detection function information included in the 3D image processing data; and handling edge violation of the area by using the 3D edge violation area detection function information.

12 Claims, 10 Drawing Sheets

(51) Int. Cl.
*H04N 21/81* (2011.01)
*H04N 19/597* (2014.01)
*H04N 19/70* (2014.01)
*H04N 21/43* (2011.01)
*H04N 13/04* (2006.01)

(52) U.S. Cl.
CPC ..... *H04N 13/0066* (2013.01); *H04N 13/0445* (2013.01); *H04N 19/597* (2014.11); *H04N 19/70* (2014.11); *H04N 21/43* (2013.01); *H04N 21/816* (2013.01)

(58) Field of Classification Search
USPC .................................................. 375/240.16
See application file for complete search history.

(56) References Cited

U.S. PATENT DOCUMENTS

| | | | |
|---|---|---|---|
| 2011/0254926 A1 | 10/2011 | Ushiki et al. | |
| 2012/0056984 A1 | 3/2012 | Zhang et al. | |
| 2012/0163703 A1 | 6/2012 | Lim et al. | |
| 2012/0212480 A1 | 8/2012 | Cho et al. | |
| 2012/0229600 A1 | 9/2012 | Zhang et al. | |
| 2013/0307928 A1 | 11/2013 | Choe et al. | |

FOREIGN PATENT DOCUMENTS

| | | |
|---|---|---|
| JP | 2012186781 A | 9/2012 |
| KR | 10-2009-0014532 A | 2/2009 |
| KR | 10-2011-0106289 A | 9/2011 |
| KR | 10-2012-0023431 A | 3/2012 |
| KR | 10-2012-0089921 A | 8/2012 |
| KR | 10-2012-0101881 A | 9/2012 |
| WO | 2012007867 A1 | 1/2012 |
| WO | 2012099108 A1 | 7/2012 |
| WO | 2012102522 A2 | 8/2012 |

OTHER PUBLICATIONS

Search Report of European Patent Office in Application No. 13849001.6, dated Oct. 5, 2016.

\* cited by examiner

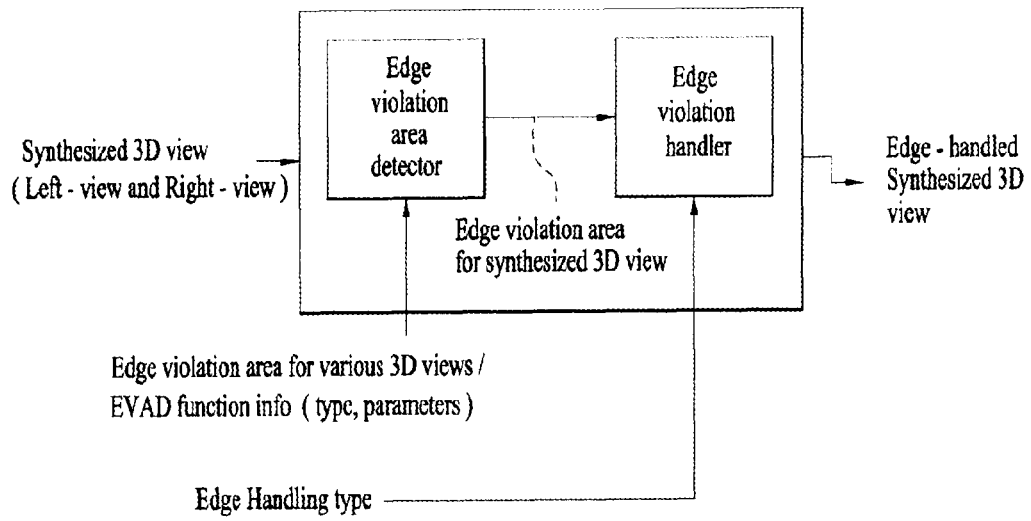

FIG. 6

| 3D_view_processing_info( payloadSize ) { | C | Descriptor |
|---|---|---|
| 3D_view_processing_info_id | 5 | ue(v) |
| 3D_view_processing_update_flag | 5 | u(1) |
| num_3D_views | 5 | u(8) |
| for ( k=0; k < num_3D_views; k++ ) { | | |
| 3D_view_ID | 5 | u(8) |
| 3D_view_priority | 5 | u(8) |
| synthesized_L_flag | 5 | u(1) |
| synthesized_R_flag | 5 | u(1) |
| if( synthesized_L_flag = = '0' ) { | | |
| Left_view_ID | 5 | u(13) |
| L_camera_parameter_exist_flag | 5 | u(1) |
| } else if ( synthesized_L_flag = = '1' ) { | | |
| L_cam_baseline_distance | 5 | u(16) |
| } | | |
| if( synthesized_R_flag = = '0' ) { | | |
| right_view_ID | 5 | u(13) |
| R_camera_parameter_exist_flag | 5 | u(1) |
| } else if ( synthesized_R_flag = = '1' ) { | | |
| R_cam_baseline_distance | 5 | u(16) |
| } | | |
| 3D_edge_handling_info( ) | | |
| if( synthesized_L_flag = = '0' || synthesized_R_flag = = '0' ) { | | |
| 3D_EVAD_funtion_info ( ) | | |
| } | | |
| } | | |
| } | | |

FIG. 7

| 3D_edge_handling_info () { | C | Descriptor |
|---|---|---|
| 3D_edge_handling_update_flag | 5 | u(1) |
| LL_edge_pixel_width | 5 | ue(v) |
| RR_edge_pixel_width | 5 | ue(v) |
| L_handling_type | 5 | u(1) |
| R_handling_type | 5 | u(1) |
| If ( L_handling_type == '10' ) { | | |
| LL_stretch_start_pixel | 5 | ue(v) |
| LL_stretch_width_pixel | 5 | ue(v) |
| LL_stretch_parameter() | | |
| } | | |
| If ( R_handling_type == '10' ) { | | |
| RR_stretch_start_pixel | 5 | ue(v) |
| RR_stretch_width_pixel | 5 | ue(v) |
| RR_stretch_parameter() | | |
| } | | |
| EH_min_disparity | 5 | se(v) |
| } | | |

FIG. 8

| 3D_EVAD_function_info ( ) { | C | Descriptor |
|---|---|---|
| LL_function_type | 5 | ue ( v ) |
| RR_function_type | 5 | ue ( v ) |
| if ( LL_function_type == 1 ) { | | |
| LL_coefficient | 5 | ue ( v ) |
| } | | |
| if ( RR_function_type == 1) { | | |
| RR_coefficient | 5 | ue ( v ) |
| } | | |
| } | | |

FIG. 9
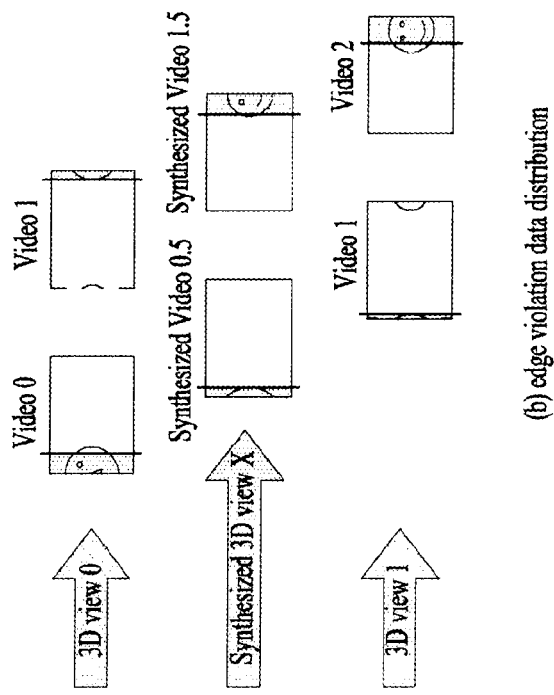
(b) edge violation data distribution
in case that 3D view X of new central viewpoint
is generated based on 3D view 0 and 3D view 1
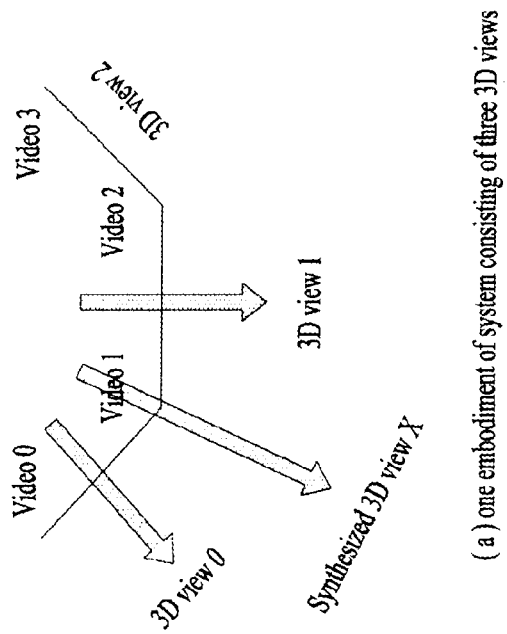
(a) one embodiment of system consisting of three 3D views

FIG. 10

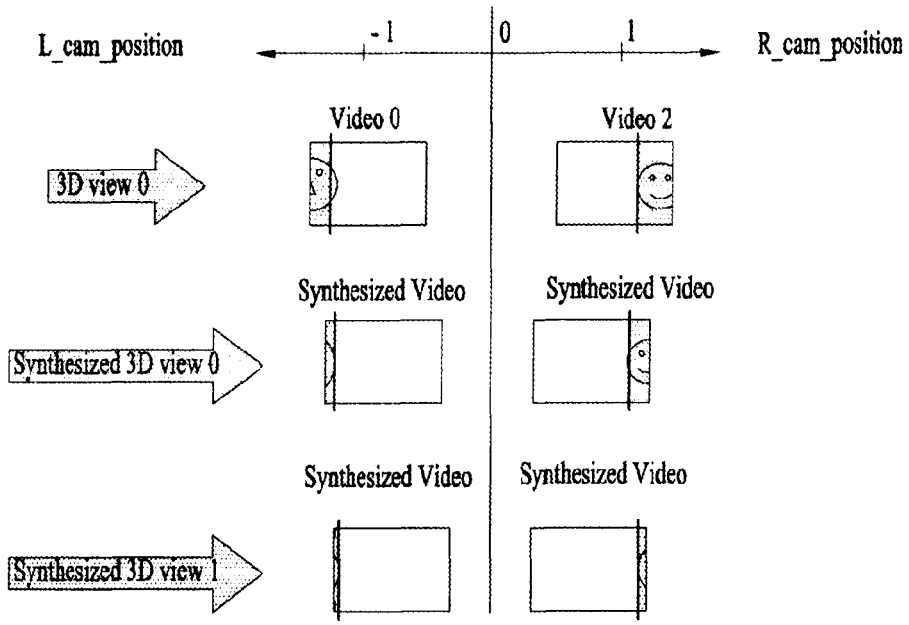

FIG. 11

$EV_{V1V2, L\_edge}(R) = \{p \in R, p \in V_1 \cap p \notin V_2\}$  [식 1-1]

$EV_{V1V2, R\_edge}(R) = \{p \in R, p \notin V_1 \cap p \in V_2\}$  [식 1-2]

$EV_{V1S12, L\_edge}(R') = \{p \in R', p \in V_1 \cap p \notin S_{12}\}$  [식 2-1]

$EV_{V1S12, R\_edge}(R') = \{p \in R', p \notin V_1 \cap p \in S_{12}\}$  [식 2-2]

$EV_{VnVk, X\_edge}(R)$ : In case of composing stereo pair using Vn and Vk image, area in which edge violation occurs at X (L or R) boundary.

In this case, Vn corresponds to left image and Vk corresponds to right image, i.e., an area processed via edge violation handling.

Snk indicates virtual view (synthesized view) made using Vn and Vk.

METHOD AND APPARATUS FOR PROCESSING EDGE VIOLATION PHENOMENON IN MULTI-VIEW 3DTV SERVICE

This application is a National Stage Entry of International Application No. PCT/KR2013/009597 filed Oct. 25, 2013, and claims the benefit of U.S. Provisional Application No. 61/718,681 filed Oct. 25, 2012, both of which are hereby incorporated by reference for all purposes as if fully set forth herein in their entireties.

TECHNICAL FIELD

The present invention relates to a method of processing a digital broadcast signal including a multi-view 3D image and an apparatus therefor, and more particularly, to a method of processing or avoiding an edge violation phenomenon, which occurs in a left/right boundary of each viewpoint image in the course of providing a multi-view 3D image service, and an apparatus therefor.

BACKGROUND ART

As the dissemination of a 3 dimensional television (3DTV) is raging, transmission of 3D image contents transmitted by a digital broadcasting as well as dissemination of the 3D image contents performed by a storing media is vitalized.

In general, a 3D image provides a 3D effect using a principle of stereo vision of two eyes. Since a human feels perspective via parallax of two eyes, in other word, binocular parallax due to a space between two eyes apart from each other about 65 mm, the 3D image may provide the 3D effect and the perspective in a manner of providing an image, which makes a left eye and a right eye see a related plane image, respectively.

The 3D image display method includes a stereoscopic technique, a volumetric technique, a holographic technique, and the like. In case of the stereoscopic technique, it provides a left view image supposed to be watched by a left eye and a right view image supposed to be watched by a right eye. The stereoscopic technique enables a human to recognize a 3D image effect in a manner of making the left eye and the right eye watch the left view image and the right view image, respectively, using a polarized glasses or a display device itself.

In case of stereoscopic 3D image content, if two similar images having viewpoints different from each other are transmitted, the stereoscopic technique uses a technique that a receiver displays a 3D image using the two images. When the 3D image is displayed by the receiver, binocular parallax occurs due to a disparity between a left image and a right image. By doing so, a 3D image can be provided.

When a 3D image is provided, an object of negative disparity, which is configured to pop up to the front side of a screen (to a viewer side) due to binocular parallax according to each content, a scene within content, or a frame, may hang on the left and the right edge of the screen. In this case, a difference occurs between a depth recognized by binocular parallax and a depth recognized by a screen edge bezel and a user may feel a distorted depth.

This phenomenon is called an edge violation. Due to the edge violation phenomenon, a viewer may feel visual fatigue and it may be difficult for the viewer to normally watch contents. Currently, a 3D image receiver does not have a separate process capable of processing the edge violation.

In particular, in case of a multi-view 3D image, an aspect of an edge violation may vary according to each viewpoint. Currently, there is no method capable of solving the edge violation of various aspects.

In multi-view 3D broadcasting environment, inconvenience and distortion of different levels resulted from the edge violation may occur according to each of 3D viewpoints. Yet, a current 3DTV receiver does not have a method capable of processing the distortion phenomenon occurring according to each of 3D viewpoints.

In particular, when an image is included in stereo image pairs (view pair) different from each other in a manner of being duplicated, a method of transmitting contents, which is rendered by a broadcasting station in advance to prevent a distortion phenomenon due to the edge violation from being occurred, is not applicable.

DISCLOSURE OF THE INVENTION

Technical Task

A technical task of the present invention is to solve the aforementioned problem. More specifically, a technical task of the present invention is to efficiently solve an edge violation of various aspects capable of being occurred in case of providing a multi-view 3D image broadcasting service.

Technical Solution

To achieve these and other advantages and in accordance with the purpose of the present invention, as embodied and broadly described, according to one embodiment, a method of receiving a multi-view 3D image broadcast signal, which processes edge violation in a multi-view 3D image, includes the steps of receiving a broadcast signal for a multi-view 3D image broadcasting, decoding a first left image data and a first right image data included in a 3D image of a first viewpoint from the received broadcast signal, parsing 3D image processing information from the received broadcast signal, generating at least one or more data among a second left image data and a second right image data included in a 3D image of a second viewpoint using the first left image data, the first right image data and the 3D image processing information, parsing 3D edge violation area detection function information included in the 3D image processing information, extracting an area of edge violation occurring in the 3D image of the second viewpoint using the 3D edge violation area detection function information and handling the edge violation of the area, and displaying the 3D image of the first viewpoint and the 3D image of the second viewpoint.

Preferably, the 3D edge violation area detection function information includes function type information identifying a type of a function used for extracting the area of the edge violation and coefficient information indicating a coefficient value used for an identified function.

Preferably, the 3D image processing information further includes location information of a camera expected to capture the second left image and the second right image and information indicating an edge violation area of the 3D image of the first viewpoint.

Preferably, the 3D image processing information further includes edge handling information including information on edge violation capable of being occurred in a 3D image of one or more viewpoints generated by a receiver.

Preferably, the edge handling information includes information on the number of pixels of an area of edge violation existing in a left image included in the 3D image of the at least one or more viewpoints and information on the number of pixels of an area of edge violation existing in a right image included in the 3D image of the at least one or more viewpoints.

Preferably, the edge handling information further includes information designating a method of handling the edge violation existing in the left image and the right image included in the 3D image of the at least one or more viewpoints.

Preferably, the edge handling information further includes information identifying a minimum disparity of the 3D image of the at least one or more viewpoints after the edge violation existing in the left image and the right image included in the 3D image of the at least one or more viewpoints is handled.

Preferably, the 3D image processing information is transmitted via an SEI (supplemental enhancement information) message.

Preferably, the 3D image processing information is transmitted via a PMT (program map table), a VCT (virtual channel table), an EIT (event information table) or an SDT (service description table).

To further achieve these and other advantages and in accordance with the purpose of the present invention, according to a different embodiment, a method of receiving a multi-view 3D image broadcast signal, which processes edge violation in a multi-view 3D image, includes the steps of receiving a broadcast signal for a multi-view 3D image broadcasting, decoding a first left image data and a first right image data included in a 3D image of a first viewpoint from the received broadcast signal, parsing 3D image processing information from the received broadcast signal, generating at least one or more data among a second left image data and a second right image data included in a 3D image of a second viewpoint using the first left image data, the first right image data and the 3D image processing information, wherein the step of generating the at least one or more data among the second left image data and the second right image data included in the 3D image of the second viewpoint includes the steps of mapping pixels included in the 3D image of the first viewpoint to the 3D image of the second viewpoint and extracting an area of edge violation occurring in the 3D image of the second viewpoint from the mapping process, handling the edge violation of the 3D image of the second viewpoint, and displaying the 3D image of the first viewpoint and the 3D image of the second viewpoint.

Preferably, the 3D image processing information includes information on a camera parameter of a camera capturing the 3D image of the first viewpoint and the step of generating the at least one or more data among the second left image data and the second right image data included in the 3D image of the second viewpoint generates the at least one or more data among the second left image data and the second right image data included in the 3D image of the second viewpoint using the information on the camera parameter.

Preferably, the step of extracting the area of the edge violation occurring in the 3D image of the second viewpoint respectively detects pixels included in a left image and a right image of the 3D image of the second viewpoint and detects an area in which a pixel exiting in the left image while not existing in the right image or a pixel existing in the right image while not existing in the left image is included as the area of the edge violation.

Advantageous Effects

According to the present invention, in case of watching a multi-view 3D image, it is able to handle an edge violation for each viewpoint.

According to the present invention, it is able to perform edge handling on a 3D image of a viewpoint not transmitted by a transmitting end.

According to the present invention, a receiver can perform edge handling although a transmitting end does not provide information (edge violation information) necessary for performing the edge handling.

DESCRIPTION OF DRAWINGS

FIG. 4 is a diagram for a method of processing an edge violation according to a different embodiment of the present invention;

FIG. 5 is a table for a structure of signaling 3D_view_processing_info via an SEI (supplemental enhancement information) message according to one embodiment of the present invention;

FIG. 6 is a table for syntax of 3D_view_processing_info according to one embodiment of the present invention;

FIG. 7 is a table for syntax of 3D_edge_handling_info( ) element according to one embodiment of the present invention;

FIG. 8 is a table for 3D edge violation area detector function information (3D_EVAD_function_info( ) element according to one embodiment of the present invention;

FIG. 9 is a diagram for a case of signaling edge handling information according to one embodiment of the present invention;

FIG. 10 is a diagram for a case of signaling a relevant function to enable a receiving end to deduct edge handling information on a virtual 3D image according to one embodiment of the present invention;

FIG. 11 is a diagram for formula used for a receiver itself to perform edge violation handling without a separate signaling according to one embodiment of the present invention;

BEST MODE

Figure 1:
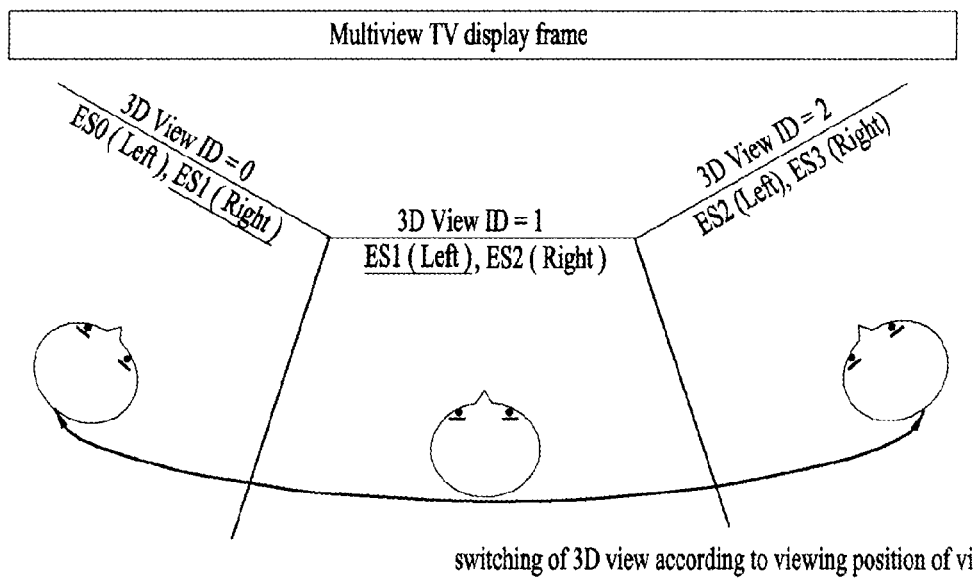
FIG. 1 is a diagram for a method of displaying a multi-view 3D image according to one embodiment of the present invention.

Reference will now be made in detail to the preferred embodiments of the present invention, examples of which are illustrated in the accompanying drawings. Yet, the present invention may be non-limited or non-restricted by the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

The method of expression for a 3 dimensional image may include a stereoscopic technique considering two viewpoints and a multiple view image technique (or a multi-view technique) considering more than 3 viewpoints. Comparably, a conventional single view image technique may be called a monoscopic image technique.

The stereoscopic technique uses a pair of image, i.e., a left view image (hereinafter a left image) and a right view image (hereinafter a right image) obtained by photographing a same subject with a left camera and a right camera, which are away a certain distance from each other. Or, the stereoscopic technique uses a pair of image of a base image and an additional image. The multi-view technique uses more than 3 images obtained by photographing with 3 or more cameras having a certain distance and angle. The multi-view technique corresponds to a technique providing the left/right image of the stereoscopic technique in each viewpoint.

According to the present invention, the stereoscopic technique includes a side-by-side, a top-down, a checker board technique, and the like. The side-by-side technique is a technique configuring one stereoscopic image by performing a half down sampling horizontally on each of a left image and a right image, respectively and situating one sampled image in a left region and the other sampled image in a right region. The top-down technique is a technique configuring one stereoscopic image by performing a half down sampling vertically on each of a left image and a right image, respectively and situating one sampled image in a top region and the other sampled image in a bottom region. The checker board technique is a technique configuring one image by performing a half down sampling in a manner that a left image and a right image respectively intersect horizontally and vertically. Yet, the stereoscopic technique according to the present invention may be non-limited or non-restricted by the aforementioned example.

As an example, it is also possible to provide a 3D image service in a manner of transceiving two images having an intact resolution without going through the aforementioned down sampling process. In this case, a transmission stream respectively transmitting a left image and a right image can be separately configured. In particular, one specific transmission stream transmits left images and another transmission stream can transmit right images. In this case, each of the transmission streams can be utilized as a stream for a 2D image service.

FIG. 1 is a diagram for a method of displaying a multi-view 3D image according to one embodiment of the present invention.

Referring to FIG. 1, a 3D image of two or more viewpoints can be provided via a single display panel.

FIG. 1 shows a scheme of providing a 3D image of 3 viewpoints. A stereo 3D image can be provided in each viewpoint. In this case, a video element stream included in each stereo 3D image can be commonly used in 3D images different from each other. For instance, an element stream 1 (ES1) is used as a right image (right view) in a 3D image where a 3D view ID corresponds to 0 and can be used as a left image (left view) in a 3D image where a 3D view ID corresponds to 1. An element stream 2 (ES2) is used as a right image (right view) in a 3D image where a 3D view ID corresponds to 1 and can be used as a left image (left view) in a 3D image where a 3D view ID corresponds to 2.

Figure 2:
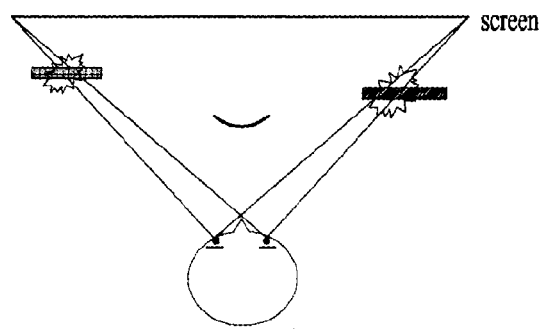
FIG. 2 is a diagram for an edge violation according to one embodiment of the present invention.

FIG. 2 is a diagram for an edge violation according to one embodiment of the present invention.

FIG. 2 corresponds to a top view of a drawing showing a relative depth of each part of an image recognized by a viewer watching a 3D image. An object of a circle form located at the center is recognized as nearest from a user and rectangles of the left and the right side are arranged at the behind of the object of the circle form. Since the rectangles, which are located at the left and the right side, have a negative disparity, the rectangles are recognized as objects positioned near the user on the basis of a screen.

Yet, at the same time, since the rectangles are positioned at both ends edge of the screen, a user may recognize it as a part of the rectangle is blocked by a bezel corresponding to an edge part of the screen. Hence, the user recognizes as the rectangles of the left and the right side are positioned at a near position of the user on the basis of the screen and the user can also recognize as the rectangles are positioned at the back of the screen since the rectangles are blocked by the bezel of the screen. Hence, the user may feel confusion in depth.

Unlike a 2D image, when a 3D stereo image is watched, a viewing angle is an important part for a display effect. For instance, when several people are watching TV while sitting side by side, in case of a 2DTV, all of the people may watch an image of a similar level. Yet, in case of a 3DTV, since a sweet spot of the 3DTV is limitative, quality of a 3D image may vary according to an angle/position of the people watching the 3D image. Hence, in case of using a multi-view image display device displaying each 3D image according to a watching position, each viewer may be able to watch a 3D image while feeling a better 3D effect.

Since a multi-view image 3D service shows a screen of viewpoints different from each other according to each position, a 3D effect, an edge violation phenomenon and the like have a different aspect in each 3D image. Hence, in order to eliminate or mitigate the edge violation phenomenon, a separate parameter should be sent according to each 3D image. In particular, two methods can be used to process the edge violation. First of all, a stereo 3DTV transmits a relevant parameter required by a receiving end to the receiving end via broadcast signaling to process the edge violation. Secondly, a transmitting end may transmit a stereo stream of which edge violation is processed in advance to the receiving end. Yet, in multi-view 3DTV broadcasting, since a method of processing or mitigating edge violation changes according to a stereo 3D image of a viewpoint in which a single stream is included, it is difficult to apply the method of transmitting a stereo stream of which edge violation is eliminated or mitigated in advance by the transmitting end. Hence, it is necessary to have broadcasting signaling that enables the receiving end to appropriately receive and process a parameter according to each viewpoint.

In this case, a 3D image considered may correspond to a directly transmitted stream or a 3D image synthesized by a receiving end. When images are synthesized, if an original image as an input causes edge violation, a new 3D image which is generated based on the original image may cause the edge violation as well. Hence, if information for supplementing the edge violation is transmitted according to a synthesized 3D image, it may be able to reduce distortion or inconvenience when a viewer watches a multi-view 3DTV.

Hence, the present invention proposes a method of implementing a receiver or a transmitter of a multi-view 3D video broadcasting service in a 3DTV providing a multi-view 3D image. And, the present invention proposes a method of operating and implementing a 3DTV to control output of a multi-view 3D video using signaling information.

Figure 3:
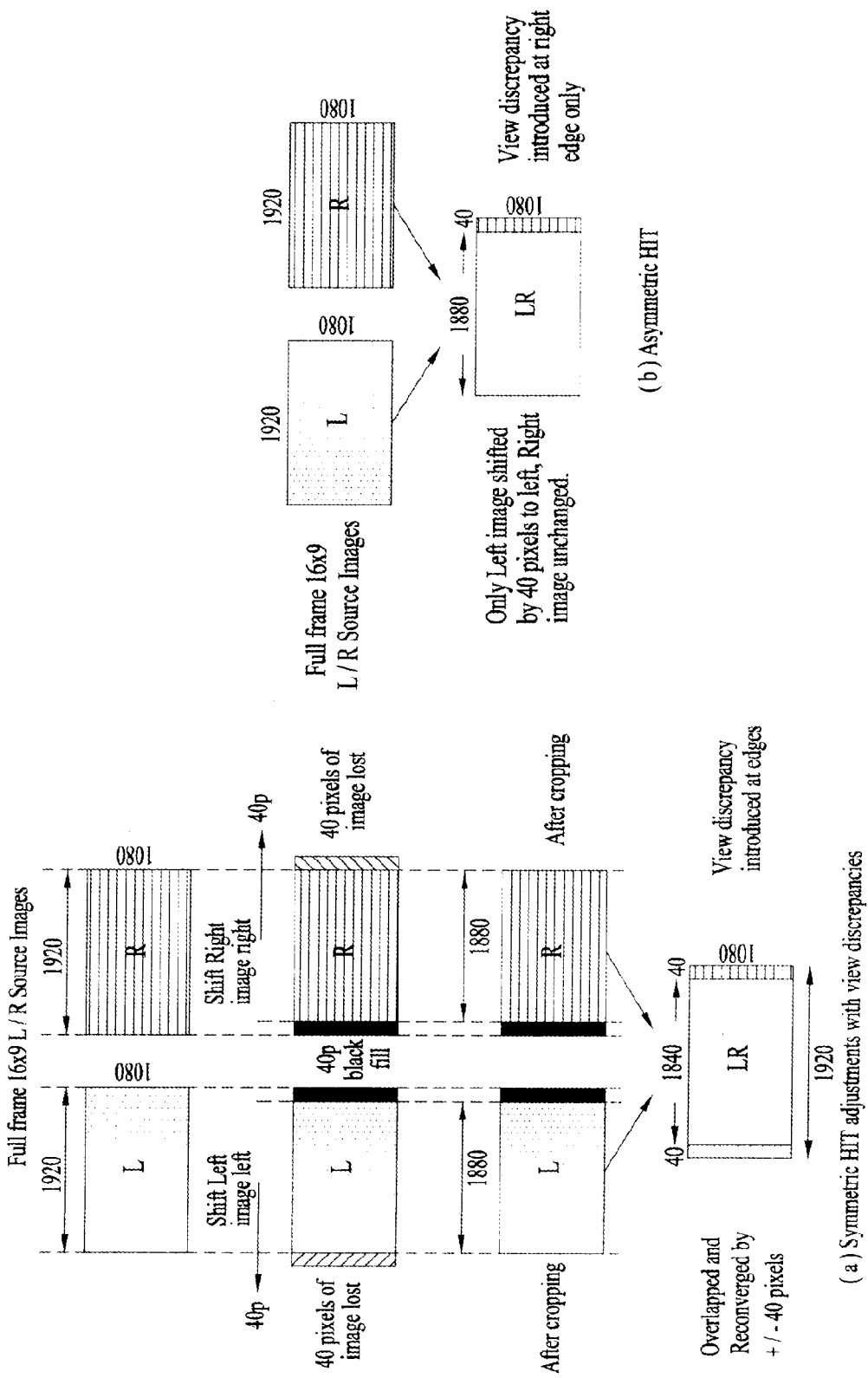
FIG. 3 is a diagram for a method of processing an edge violation according to one embodiment of the present invention.

FIG. 3 is a diagram for a method of processing an edge violation according to one embodiment of the present invention.

As one of methods processing edge violation, it may be able to use a HIT (horizontal image translation) technique that a transmitting end processes an image. According to the HIT technique, in order to prevent a distortion phenomenon from occurring in an edge side for a pair of L, R stereo image, a transmitting end performs a shift and bar (cropping) processing of the image and transmits a 3D image.

In case of not considering multi-view, a scenario of transmitting the shift and the bar processing is possible in a manner of being applied from the transmitting end. Yet, in case of a multi-view 3DTV, since a shift and a bar to be applied may vary according to each viewpoint, it may be difficult for the transmitting end to expect the shift and the bar and transmit a 3D image.

FIG. 3 (a) shows a method of moving and processing a left image and a right image included in a 3D image in horizontal direction.

Referring to FIG. 3 (a), an edge violation processor moves a left image included in a 3D image in left horizontal direction and moves a right image in right horizontal direction. In this case, a moving distance in horizontal direction can be determined according to a display size of an object causing edge violation. In particular, the left and the right image are moved in horizontal direction in order not to display the object in a screen.

In the left and the right image, the edge violation processor fills an empty area resulted from moving in horizontal direction with a bar and crops an area deviated from a frame size resulted from moving in horizontal direction.

If a 3D image is generated using the left and the right image generated by the aforementioned process, it may be able to eliminate or mitigate the edge violation. In particular, an area expected to cause edge violation is cropped and an image corresponding to either the left image or the right image can be displayed in an edge area.

FIG. 3 (b) shows a method of moving and processing a left image and a right image included in a 3D image in horizontal direction.

Referring to FIG. 3 (b), an edge violation processor maintains an original image of the right image as it is and moves the left image only in left horizontal direction. Among the left image moved in left horizontal direction, an area deviated from a frame area is cropped and the remaining left image is combined with the right image. By doing so, a 3D image can be configured.

FIG. 4 is a diagram for a method of processing an edge violation according to a different embodiment of the present invention.

In a multi-view TV, a 3D image of a new random viewpoint can be generated (or synthesized) based on a received video stream. In this case, if edge violation exists in a pair of a left/right image used for synthesizing the 3D image, edge violation may exist in the synthesized result image as well. In this case, there may exist various methods capable of eliminating, mitigating or preventing the edge violation from being existed in the newly synthesized 3D image.

A first method according to one embodiment of the present invention is to signal an edge violation area for a plurality of 3D images. (Signaling of edge violation area for various views)

According to the first method, it may be able to signal information in such a form as 3D_edge_handling_infor( ) for all synthesized 3D images. In particular, for a 3D image of many viewpoints, if signaling information on an area in which edge violation occurs is generated and the information is transmitted, a receiver may be able to reduce or mitigate the edge violation with reference to the information on the edge violation area of a corresponding viewpoint when the receiver synthesizes a 3D image. In this case, the generated signaling information can be delivered to the receiver via a broadcasting signal and/or an internet signal. The information used for supplementing, eliminating or mitigating the edge violation shall be called edge handling information, edge handling data or edge information.

A second method according to a different embodiment of the present invention is to provide signaling information for an edge violation area detector (EVAD) function. (Signaling information for edge violation area detector (EVAD) function).

According to the second method, an input corresponds to information on a camera position of a left/right image and an output can signal an edge violation area detector (EVAD) function corresponding to a pixel interval value to which edge handling to be applied. In particular, the second method corresponds to a method of signaling a type of a function and a related coefficient capable of deducting LL_edge_violation_width and RR_edge_violation_width (or, LL_edge_pixel_width and RR_edge_pixel_width). For instance, if the method signals that values of related information correspond to a linearly increasing/decreasing form, it is able to define a function via a point that a function type corresponds to a linear function, a start point value, an end point value and the like. In case of a function of a different type, it may be able to signal an additional related coefficient.

A third method according to a different embodiment of the present invention is to detect edge violation without signaling information. (Implementation of edge violation detection without signaling information)

According to the third method, when information used for eliminating, mitigating or processing edge violation is not separately signaled, a receiving end itself can detect and process an edge violation area. In this case, for a virtual image (virtual view) generated by synthesizing images (view synthesis), it is able to deduct an area in which edge violation occurs via mapping information between pixels in the course of generating the virtual image. When the receiving end outputs a received video stream as it is without synthesizing images (view synthesis), it is able to deduct an area in which edge violation occurs via such a separate process as feature matching between a left image and a right image processed in the receiving end. As an example of the feature matching, a receiver respectively detects an object or a pixel included in the left image and the right image. And, the receiver can detect an object or a pixel existing in the left image while not existing in the right image or an object or a pixel existing in the right image while not existing in the left image. The receiver can detect an area in which the object or the pixel existing in either the left image or the right image as the area in which the edge violation occurs.

Referring to FIG. 4, a receiving end can include an edge violation area detector and/or an edge violation handler.

The edge violation area detector detects an area in which edge violation occurs in a left image and a right image of a 3D image synthesized for a specific viewpoint. In this case, one or more methods among the aforementioned methods can be used to detect the area in which the edge violation occurs.

If information on edge violation occurring in a 3D image is provided for each viewpoint according to the first method, the edge violation handler eliminates, mitigates or processes the edge violation using the information. Or, the edge violation handler receives information on an edge violation area detected by the edge violation area detector and may be then able to eliminate, mitigate or process the edge violation using the information.

FIG. 5 is a table for a structure of signaling 3D_view_processing_info via an SEI (supplemental enhancement information) message according to one embodiment of the present invention.

If information related to edge violation is transmitted in a video level, it may be able to cope with an edge violation area changing according to each frame or a scene.

In case of H.264 (or AVC) video, the information on the edge violation can be transmitted to an SEI (supplemental enhancement information) area including information configured to assist such a process as decoding, outputting and the like. According to the present invention, it may be able to designate an SEI message going into the video level to transmit the edge violation information. FIG. 5 corresponds to an embodiment for a case that an SEI message signaling 3D_view_processing_info is designated. As an embodiment, if a value of a payloadType field corresponds to '50', the field can indicate an SEI message transmitting the 3D_view_processing_info.

Edge violation information or 3D edge handling information corresponds to information used for eliminating, mitigating or processing edge violation that occurs in an image of each viewpoint of a multi-view 3D image. The edge violation information or the 3D edge handling information includes 3D_view_processing_info.

FIG. 6 is a table for syntax of 3D_view_processing_info according to one embodiment of the present invention.

In order to process a part in which edge violation occurs, it may be able to use the aforementioned shift and bar method. Or, a method of drawing a bar without a shift (floating window), a method of processing edge violation via cropping and partial scaling without drawing a bar and the like can be used. Since a parameter applied to each processing method is different from each other, it is necessary to have a method of transmitting edge violation handling data or edge violation information to signal a parameter applied to each processing method. Edge processing-related data can be given as metadata for video contents.

3D image processing information (3D_view_processing_infor) according to one embodiment of the present invention includes a 3D_view_processing_info_id field, a 3D_view_processing_update_flag field, a num_3D_views field, a 3D_view_ID field, a 3D_view_priority field, a synthesized_L-flag field, a synthesized_R-flag field, a Left_view_ID field, a L_camera_parameter_exist_flag field, a L_cam_baseline_distance field, a right_view_ID field, an R_camera_parameter_exist_flag field, an R_cam_baseline_distance field, a 3D_edge_handling_info( ) element, and/or a 3D_EVAD_function_info( ) element.

The 3D_view_processing_info_id field corresponds to information uniquely identifying 3D image processing information.

The 3D_view_processing_update_flag field corresponds to a field indicating whether currently transmitted 3D image processing information is identical to previously received information or whether currently transmitted 3D image processing information is necessary to be newly updated. If the currently transmitted 3D image processing information is required to be updated, the 3D_view_processing_update_flag field is set to '1'. If the currently transmitted 3D image processing information is identical to the previously received information, the 3D_view_processing_update_flag field is set to '0'.

The num_3D_views field corresponds to a field indicating the number of virtual 3D images signaling a 3D image (a pair of left image and right image) included in a current program, a channel, or a service.

The 3D_view_ID field corresponds to a field indicating a value capable of identifying each 3D image.

The 3D_view_priority field corresponds to a field indicating priority of a 3D image.

The synthesized_L-flag field or the synthesized_R-flag field corresponds to a field indicating whether a left image or a right image constructing a 3D image corresponds to an image synthesized by a receiver or an image actually transmitted. If a value of the synthesized_X-flag field corresponds to '0', it indicates that a corresponding view is a video image actually transmitted. If a value of the synthesized_X-flag field corresponds to '1', it indicates that a corresponding view is a virtual image synthesized by the receiver.

The Left_view_ID field or the right_view_ID field corresponds to an identifier indicating a video stream included in a left image or a right image of a 3D image when the left image and/or the right image constructing the 3D image is actually transmitted. In some cases, a value of the identifier can be replaced with a PID value of a left image video or a right image video.

The L_camera_parameter_exist_flag field or the R_camera_parameter_exist_flag field corresponds to a field indicating whether a camera parameter value (a parameter necessary for performing view synthesis) for an image exists. For instance, in case of a MVC codec, since a camera parameter is transmitted via a Multiview_acquisition_info SEI message and a camera parameter exists according to each view ID, the L_camera_parameter_exist_flag field or the R_camera_parameter_exist_flag field indicates whether the SEI message is separately transmitted. Instead of transmitting the camera_parameter_exist_flag, an ID value itself of a corresponding camera parameter set can be transmitted. In this case, an intrinsic camera parameter signaled by the Multiview_acquisition_info SEI message may exist according to each image. Or, there may exist a common parameter set for all images. In case of an extrinsic camera parameter, a separate parameter set exists according to each image. Hence, it may be able to transmit an identifier in a manner that a camera parameter is divided into the intrinsic camera parameter and the extrinsic camera parameter.

For view synthesis, it is necessary to signal not only a camera parameter but also whether there exists a depth map of a viewpoint identical to a video view. To this end, it may be able to configure to signal such a field as an L_depth_map_exist_flag field and/or an R_depth_map_exist_flag field and the like. The L_depth_map_exist_flag field or the R_depth_map_exist_flag field corresponds to a field indicating whether a depth map for a left image or a right image exists.

The L_cam_baseline_distance field or the R_cam_baseline_distance field corresponds to a field indicting viewpoint information of a left virtual image or a right virtual image. This field corresponds to a value inputted as an input value in the course of processing view synthesis. Since a camera parameter or partial information of the camera parameter is necessary as the input value according to a view synthesis method, this field can be configured to transmit related information according to the method. The L_cam_baseline_distance field or the R_cam_baseline_distance field may correspond to information indicating a position of a virtual camera capturing a virtual image. For instance, the L_cam_baseline_distance field or the R_cam_baseline_distance field can indicate a relative position of a virtual left image capturing camera or a virtual right image capturing camera on a baseline.

The aforementioned fields or information can be used for information utilized by a receiver to synthesize a virtual 3D image (a virtual left image and a virtual right image) of a new viewpoint.

The 3D_edge_handling_info( ) element and the 3D_EVAD_function_info( ) element is described in the following.

FIG. 7 is a table for syntax of 3D_edge_handling_info( ) element according to one embodiment of the present invention.

Edge processing-related data can be given as meta data for video contents. As shown in FIG. 7, the edge processing-related data can be transmitted via a 3D_edge_handling_info( ) element. In this case, in order to process a part in which edge violation occurs, it may be able to use the aforementioned shift and bar method. Or, a method of drawing a bar without a shift (floating window), a method of processing edge violation via cropping and partial scaling without drawing a bar and the like can be used. Since a parameter applied to each processing method is different from each other, it is necessary to have a method of transmitting edge violation handling data or edge violation information to signal a parameter applied to each processing method.

As mentioned in the foregoing description, a method of preventing a mismatching distortion, i.e., edge violation, from being occurred in a left view and a right view includes a method of sending 3D contents after post-processing is performed on the 3D contents in advance, a method of sending a parameter of a recommended edge handling technique (floating window/vertical edge treatment/HIT parameter), a method of sending a recommended vertical edge treatment parameter and the like. It may be able to apply a different method to each edge according to a situation. An application method may vary according to a frame.

In this case, it may separately have edge_violation_flag to indicate whether or not window violation occurs according to an edge of a 3D image. For instance, if a value of the edge_violation_flag corresponds to '00', it may indicate that edge violation does not occur in both a left edge and a right edge of a 3D image. If a value of the edge_violation_flag corresponds to '01', it may indicate that edge violation occurs in the right edge of the 3D image only. If a value of the edge_violation_flag corresponds to '10', it may indicate that edge violation occurs in the left edge of the 3D image only. If a value of the edge_violation_flag corresponds to '11', it may indicate that edge violation occurs in both the left edge and the right edge of the 3D image. If the edge_violation_flag is signaled, a receiver can determine whether to perform post-processing on the 3D image. The edge_violation_flag can be included in the 3D_view_processing_info or the 3D_edge_handling_info( ) element.

The 3D_edge_handling_info( ) element includes a 3D_edge_handling_update_flag field, an LL_edge_pixel_width field, an RR_edge_pixel_width field, an L_handling_type field, an R_handling_type field, an LL_stretch_start_pixel field, an LL_stretch_width_pixel field, an LL_stretch_parameter( ) element, an RR_stretch_start_pixel field, an RR_stretch_width_pixel field, an RR_stretch_parameter( ) element, and/or an EH_min_disparity field.

The 3D_edge_handling_update_flag field corresponds to a field indicating whether currently transmitted 3D edge handling information is identical to previously received information or whether currently transmitted 3D edge handling information is necessary to be newly updated. If the currently transmitted 3D edge handling information is required to be updated, the 3D_edge_handling_update_flag field is set to '1'. If the currently transmitted 3D edge handling information is identical to the previously received information, the 3D_edge_handling_update_flag field is set to '0'.

The LL_edge_pixel_width field and the RR_edge_pixel_width field indicate the number of pixels of an edge violation area existing in a left edge of a left image and the number of pixels of an edge violation area existing in a right edge of a right image, respectively. If a value of the LL_edge_pixel_width field corresponds to '0', it indicates that edge violation does not occur in the left edge of the left image. In this case, an edge_violation_flag field may separately exist to indicate whether or not window violation occurs according to an edge of a 3D image.

The L_handling_type field and the R_handling_type field respectively designate a method of processing edge violation applied to a left image or a right image. For instance, if a value of the field corresponds to '00', it may indicate a preprocessed (pre-handled) state, i.e., a state that edge violation is processed by a transmitting end in advance. If a value of the field corresponds to '01', it may indicate a bar (floating window) recommended state, i.e., a state that a method of filling an area in which edge violation occurs with a bar is recommended. If a value of the field corresponds to '10', it may indicate a crop and stretch (vertical edge treatment) recommended state, i.e., a state that a method of processing edge violation using cropping and stretching is recommended. If a value of the field corresponds to '11', it may indicate a shift and bar (HIT) recommended state, i.e., a state that a method of shifting an image as much as an area in which edge violation occurs, cropping a part deviated from a frame, and filling a remaining part of the frame with a bar is recommended.

The LL_stretch_start_pixel field and the RR_stretch_start_pixel field are applied when a value of the L_handling_type field and a value of the R_handling_type field correspond to '10'. The LL_stretch_start_pixel field and the RR_stretch_start_pixel field respectively indicate an area in which stretch starts on the basis of a left edge of a left image or a right edge of a right image.

The LL_stretch_width_pixel field and the RR_stretch_width_pixel field are applied when a value of the L_handling_type field and/or a value of the R_handling_type field correspond to '10'. The LL_stretch_width_pixel field and the RR_stretch_width_pixel field respectively indicate a width of a stretched area on the basis of an area in which stretch starts.

The LL_stretch_parameter( ) element and the RR_stretch_parameter( ) element are applied when a value of the L_handling_type field and/or a value of the R_handling_type field correspond to '10'. The LL_stretch_parameter( ) element and the RR_stretch_parameter( ) element can include a parameter used for stretching in case of using a method of crop and stretch.

The EH_min_disparity field indicates a minimum disparity value after post-processing is performed on edge violation. If edge violation occurring at the front side of a screen is blocked, the minimum disparity value may change according to the blocked edge violation. Hence, when a receiver pops up On Screen Display (OSD) on a stereo image on which edge handling process is performed, the receiver can determine a display depth of the OSD in consideration of the minimum disparity value. In order to notify a total disparity range, it may have a scenario of transmitting an EH_max_disparity field together with the EH_min_disparity field. In some cases, it may be able to configure a disparity range of an original image to be transmitted as well. Or, it may have such a separate field as a disparity_range_change_flag field to signal whether or not a display range (min. and max. disparity value) is changed after edge handling is applied.

In this case, when an object of a 3D image is located at a left image and a right image, a disparity corresponds to a difference of a horizontal distance of the object located at the left image and the right image. A depth of the object perceived by a viewer may vary according to a value of the disparity.

FIG. 8 is a table for 3D edge violation area detector function information (3D_EVAD_function_info( )) element according to one embodiment of the present invention.

If both a left image and a right image constructing a 3D image correspond to a video actually transmitted, a receiving end may be able to generate a new virtual 3D image based on the 3D image. In this case, although an edge violation area existing in the received left image and the right image can be known via the aforementioned 3D edge handling information and the like, it is difficult to know an edge violation area of a virtual left image and a virtual right image of a viewpoint randomly selected by the receiving end using contents of the aforementioned method only. Hence, it is necessary for the receiving end to have a method of deducting each edge violation area of a left image and a right image, which are generated according to a camera view (camera capturing position) of a virtual 3D image.

According to the present invention, a 3D edge violation area detection (3D EVAD) function corresponds to a function capable of deducting an edge violation area pixel value in a random camera viewpoint based on camera parameter information of a received left image and a right image, additional information (depth information of the left image and the right image, and the like) and information on each edge violation area of the left image and the right image, which are used for view synthesis. For instance, when cameras are arranged in a form of 1D parallel, there may exist a function for deducting edge violation area information in a random viewpoint putting on a baseline of the camera arrangement. In this case, a view position of a camera can be represented by form of a baseline distance. The function receives a baseline distance value of the camera as an input value and outputs edge violation area information of the viewpoint. The baseline distance may become a value indicating a position of the camera on the baseline.

FIG. 8 shows a 3D EVAD function for a case that a camera position value is normalized on the basis of a center of a left image camera and a right image camera. In particular, if L_cam_position (or R_cam_position) corresponds to 1 and a camera position becoming a central point between two cameras corresponds to 0, it may be able to signal the function designating a value of the camera position increasing 0 to 1 as an input value and designating the number of pixels of an edge violation area in a left edge of a left image (or a right edge of a right image) as an output value. In this case, the L_cam_position corresponds to a value indicating a position of a camera capturing the left image and the R_cam_position corresponds to a value indicating a position of a camera capturing the right image. The L_cam_position field and the R_cam_position field can be included in the 3D_EVAD_function_info( ) element. Or, the L_cam_position field and the R_cam_position field may correspond to the aforementioned L_cam_baseline_distance field and the R_cam_baseline_distance field, respectively.

The 3D_EVAD_function_info( ) element includes an LL_function_type field, an RR_function_type field, an LL_coefficient field, and/or an RR_coefficient field.

The LL_function_type field and the RR_function_type field correspond to fields indicating a type of a 3D EVAD function. There may exist various types of function. As an embodiment, if a value of the field corresponds to '1', it may be able to indicate 'linear function'.

The LL_coefficient field and the RR_coefficient field correspond to fields indicating a coefficient of the aforementioned function. If XX_function_type corresponds to 'linear function', a function can be defined as follows.

{Number of pixels indicating edge violation area of
XX_edge=XX_coefficient*X_cam_position+
XX_edge_pixel_width}

As mentioned in the foregoing description, since edge violation information is highly probable to be changed according to each frame, video level signaling is suitable. Yet, in some cases, it may apply identical edge violation handling information according to a scene, an event and program/channel/service. If there is an edge violation handling method recommended by a transmitting end, the information signaled by the video level signaling can be transmitted in an event or a system unit. In particular, information of an event unit can be transmitted in a manner of putting a new descriptor on such a table capable of transmitting information of an event unit as ATSC PSIP or EIT of DVB SI. Or, information of program/channel/service unit can be transmitted in a manner of putting a new descriptor on such a table capable of transmitting information of a system level as PMT, VCT, SDT and the like. Information of the aforementioned fields or elements can be included in the descriptor.

In case of transmitting edge violation handling information according to a scene, interval information (start time and end time of each scene) of a scene can be additionally transmitted to a descriptor of a system level. Or, the edge violation handling information can be transmitted in a private stream form by composing the edge violation handling information in an interval unit according to time. In this case, it is necessary to have a procedure of synchronizing a video signal and an edge violation handling information stream with each other. Edge violation of a 3D image can be processed by the synchronization.

FIG. 9 is a diagram for a case of signaling edge handling information according to one embodiment of the present invention.

Referring to FIG. 9 (a), a 3D broadcasting system provides a 3D image of 3 viewpoints (3D view 0, 3D view 1 and 3D view 2). A 3D image of the 3D view 0 includes a video 0 and a video 1. A 3D image of the 3D view 1 includes the video 1 and a video 2. A 3D image of the 3D view 2 includes the video 2 and a video 3. A transmitting end can provide edge handling information of each viewpoint via the aforementioned signaling method. And, edge handling information on a 3D image of a different viewpoint capable of being synthesized by a receiver can also be signaled together.

Referring to FIG. 9 (b), a 3D image of a 3D view 0 can include a video 0 and a video 1. A transmitting end can signal information on a position of a camera capturing the video 0, information on a position of a camera capturing the video 1, information on a width of an edge violation area of the video 0 and information on a width of an edge violation area of the video 1. For instance, such information as L, R camera position (0, 1), edge violation width pixel: (LL, RR)=(24, 8) can be signaled for the 3D image of the 3D view 0. The L, R camera position (0, 1) corresponds to information indicating that a camera capturing a left image is positioned at a reference point of a baseline and a camera capturing a right image is apart from the baseline as much as '1'. The edge violation width pixel: (LL, RR)=(24, 8) corresponds to information indicating that edge violation occurs in an area of 24-pixel width in a left edge of the left image and edge violation occurs in an area of 8-pixel width in a right edge of the right image.

A 3D image of a 3D view 1 can include a video 1 and a video 2. A transmitting end can signal information on a position of a camera capturing the video 1, information on a position of a camera capturing the video 2, information on a width of an edge violation area of the video 1 and information on a width of an edge violation area of the video 2. For instance, such information as L, R camera position (1, 2), edge violation width pixel: (LL, RR)=(3, 36) can be signaled for the 3D image of the 3D view 1. The L, R camera position (1, 2) corresponds to information indicating that a camera capturing a left image is apart from a reference point of a baseline as much as '1' and a camera capturing a right image is apart from the baseline as much as '2'. The edge violation width pixel: (LL, RR)=(3, 36) corresponds to information indicating that edge violation occurs in an area of 3-pixel width in a left edge of the left image and edge violation occurs in an area of 36-pixel width in a right edge of the right image.

The transmitting end can signal edge handling information for a 3D image of a different viewpoint capable of being synthesized by a receiving end. A 3D image of a synthesized 3D view X can include a synthesized video 0.5 and a synthesized video 1.5. The synthesized video 0.5 and the synthesized video 1.5 correspond to a video data newly generated by the receiving end using a video data received by the receiving end. In particular, the synthesized video 0.5 and the synthesized video 1.5 corresponds to a video data synthesized by the receiving end to provide a 3D image of a new viewpoint. The transmitting end can signal information on a position of a virtual camera expected to capture the video 0.5, information on a position of a virtual camera expected to capture the video 1.5, information on a width of an edge violation area of the video 0.5 in which edge violation is expected to occur and information on a width of an edge violation area of the video 1.5 in which edge violation is expected to occur. For instance, the transmitting end can signal such information as L, R camera position (0.5, 1.5) edge violation width pixel: (LL, RR)=(10, 25). The L, R camera position (0.5, 1.5) corresponds to information indicating that a virtual camera capturing a left image is apart from a reference point of a baseline as much as '0.5' and a virtual camera capturing a right image is apart from the baseline as much as '1.5'. The edge violation width pixel: (LL, RR)=(10, 25) corresponds to information indicating that edge violation occurs in an area of 10-pixel width in a left edge of the left image and edge violation occurs in an area of 25-pixel width in a right edge of the right image. In particular, the transmitting end can signal information on the edge violation areas of the left image and the right image in which edge violation is expected to occur according to a position of a virtual camera.

FIG. 10 is a diagram for a case of signaling a relevant function to enable a receiving end to deduct edge handling information on a virtual 3D image according to one embodiment of the present invention.

As mentioned in the foregoing description, a receiver can deduct edge violation area information (edge handling information) of a 3D image synthesized in a multi-view TV. The receiver can deduct an edge violation pixel width of a synthesized 3D view 0 and an edge violation pixel width of a synthesized 3D view 1 using a left image (video 0) and a right image (video 2) of a 3D view 0 and relevant information (L_cam_position, LL_edge_pixel_width, R_cam_position, and RR_edge_pixel_width) as input values. In this case, it may be able to use signaled LL_function_type, LL_coefficient, RR_function_type and RR_coefficient value. Explanation on the signaled parameters or fields is replaced with the contents mentioned earlier in the foregoing description.

According to the method mentioned earlier in FIG. 9, since an edge violation pixel width value itself is transmitted according to each synthesized 3D image, information on an edge violation pixel width of a synthesized 3D view including a random camera position may not be known in some cases. In this case, it may be able to know edge handling information on a 3D image of a specific camera position only. On the contrary, as shown in FIG. 10, if a relevant function is signaled to enable a receiving end to deduct edge handling information on a virtual 3D image, since a function capable of deducting an edge violation pixel width according to each interval is signaled, it may be able to deduct edge handling information on all 3D image pair existing within an interval.

FIG. 11 is a diagram for formula used for a receiver itself to perform edge violation handling without a separate signaling according to one embodiment of the present invention.

When a receiving end synthesizes images with each other (view synthesis), since the receiving end undergoes a process of mapping each pixel of the images to an image of a new viewpoint, the receiving end may be able to know a pixel of a legacy image corresponding to each pixel of the new viewpoint. By doing so, the receiving end can extract information on an edge violation area of a newly composed 3D image pair (left image and a right image).

In particular, although an edge violation area located at a left edge of a 3D image does not exist in a right image, the edge violation area may correspond to an area or an object existing in a left image only (Formula 1-1, 2-1). Although an edge violation area located at a right edge of the 3D image does not exist in the left image, the edge violation area may correspond to an area or an object existing in a right image only (Formula 1-2, 2-2). Instead of a newly synthesized image, edge violation information of a received 3D image can also deduct an edge violation area via such a technique as feature matching and the like. (Formula 1-1, 2-2)

In particular, referring to (Formula 1-1), if a pixel (p) existing in a left image (V1) does not exist in a right image (V2), it can be determined as the pixel is located at a left side edge violation area.

Referring to (Formula 1-2), if a pixel (p) not existing in a left image (V1) exists in a right image (V2), it can be determined as the pixel is located at a right side edge violation area.

Referring to (Formula 2-1), if a pixel (p) existing in a left image (V1) does not exist in a synthesized right image (S12), it can be determined as the pixel is located at a left side edge violation area of a synthesized 3D image.

Referring to (Formula 2-2), if a pixel (p) not existing in a left image (V1) exists in a synthesized right image (S12), it can be determined as the pixel is located at a right side edge violation area of a synthesized 3D image.

A receiver determines whether each pixel exists in an edge violation area using the aforementioned technique and may be then able to determine an area in which edge violation occurs with a lastly received 3D image (or a synthesized 3D image).

Figure 12:
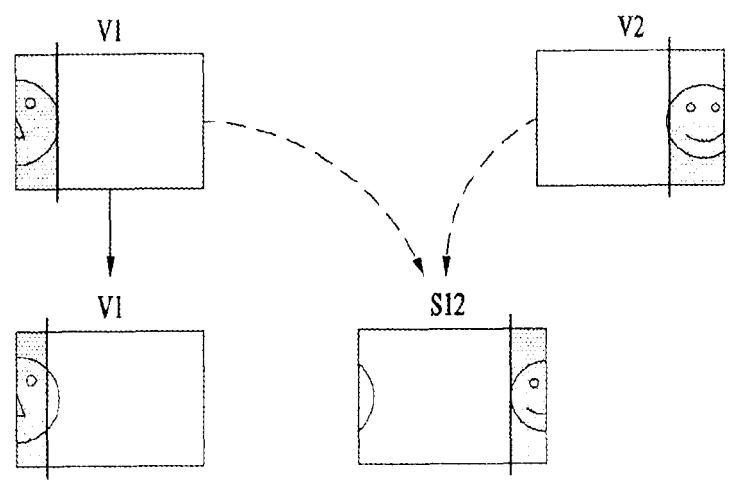
FIG. 12 is a diagram for a case of performing edge violation handling performed by a receiver itself without a separate signaling according to one embodiment of the present invention.

FIG. 12 is a diagram for a case of performing edge violation handling performed by a receiver itself without a separate signaling according to one embodiment of the present invention.

A V1 and a V2 respectively correspond to a left image and a right image of a received stereo 3D image. A V1 and an S12 respectively correspond to a left image and a right image of a newly synthesized stereo 3D image. The S12 corresponds to an image synthesized based on the V1 and the V2. The V1 is identical to a received image. In this case, a shaded part of the drawing indicates an area in which edge violation has occurred.

For instance, when the technique mentioned earlier in FIG. 11 is applied, if it is determined that at least one of pixels vertically arranged in a frame is included in an edge violation area, it is able to configure a receiver to determine it as all vertically arranged pixels are included in the edge violation area.

Figure 13:
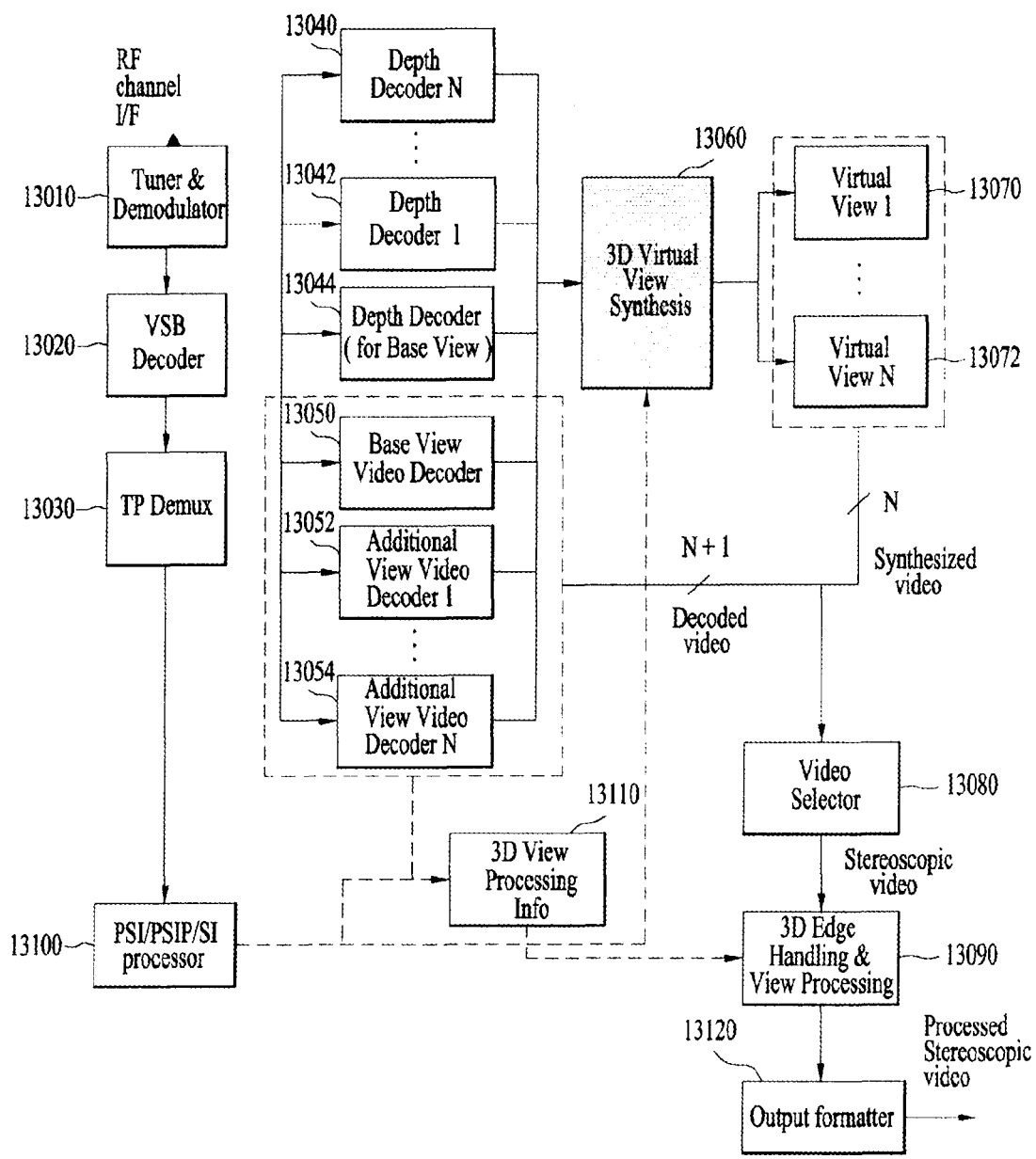
FIG. 13 is a diagram for a multi-view 3D image receiver according to one embodiment of the present invention.

FIG. 13 is a diagram for a multi-view 3D image receiver according to one embodiment of the present invention.

A 3D image receiver according to one embodiment of the present invention includes a tuner & demodulator 13010, a VSB decoder 13020, a TP demux 13030, a depth decoder 13040/13042/13044, a video decoder 13050/13052/13054, a 3D virtual view synthesis 13060, a virtual view processor 13070/13072, a video selector 13080, a 3D edge handling & view processing 13090, a PSI/PSIP/SI processor 13100, a 3D view info processing 13110 and/or an output formatter 13120.

The tuner & demodulator 13010 receives a broadcast signal. The tuner & demodulator 13010 demodulates a broadcast signal.

The VSB decoder 13020 performs demodulation according to a modulation scheme. The VSB decoder 13020 demodulates a signal modulated by a VSB scheme, a signal modulated by an OFDM scheme and the like. The VSB decoder 13020 can be included in the tuner & demodulator or may separately exist.

The TP demux 13030 extracts a transport stream or a transport stream packet from a broadcast signal.

The depth decoder 13040/13042/13044 decodes depth-related information included in a broadcast signal. The depth-related information can be transmitted in such a form as a broadcast packet, a transport packet, a data segment, a video header and a video access unit header. Each depth decoder decodes depth information on each image included in each 3D image.

The video decoder 13050/13052/13054 decodes each video image included in a broadcast signal. The video decoder decodes each image included in a 3D image. For instance, the video decoder can include a base image video decoder 13050 decoding a base image (left image and a right image) and/or an additional image video decoder 13052/13054 decoding an additional image (if a base image corresponds to a left image, a right image, If a base image corresponds to a right image, a left image). The additional image includes a video image used for making a 3D image of a reference viewpoint and/or a video image used for making a 3D image of an additional viewpoint.

The 3D virtual view synthesis 13060 generates a virtual image using a decoded base image and/or an additional image. The 3D virtual view synthesis 13060 can generate a video image included in a 3D image of a viewpoint different from a viewpoint transmitted via a broadcast signal. The 3D virtual view synthesis 13060 can use signaling information included in PSI, PSIP or DVB-SI in the course of generating a video image. The 3D virtual view synthesis 13060 can use information obtained by the 3D view info processing 13110 in the course of generating a video image.

The virtual view processor 13070/13072 separates synthesized virtual images from each other and processes the images. The virtual view processor 13070/13072 identifies a synthesized virtual image included in a 3D image of each viewpoint.

The video selector 13080 selects 2 video images (video stream) to be outputted in each 3D viewpoint unit of a multi-view display. A video image or a video stream included in a 3D image of each viewpoint may become a decoded (i.e., included in a broadcast signal) video image or a synthesized virtual video image.

The 3D edge handling & view processing 13090 processes edge violation capable of being occurred in a 3D image of each viewpoint using one or more schemes mentioned in the foregoing description. Detail explanation on a method of processing the edge violation is replaced with the contents mentioned above. The 3D edge handling & view processing 13090 may use edge handling information or function information used for generating the edge handling information in the course of performing edge handling. If edge handling-related information is not signaled by a transmitting end, the 3D edge handling & view processing 13090 extracts an edge violation area by comparing video images with each other and may be then able to perform edge handling on the extracted edge violation area.

The PSI/PSIP/SI processor 13100 parses signaling information included in a broadcast signal. The signaling information includes such information as PSI, PSIP, DVB-SI and the like. The PSI, the PSIP and the DVB-SI include a program map table (PMT), a virtual channel table (VCT), an event information table (EIT) or a service description table (SDT).

The 3D view info processing 13110 obtains an SEI message of a video level, PSI, PSIP or 3D image-related information transmitted via a descriptor of a DVB-SI level. In this case, the 3D image-related information can include depth map information, a camera parameter, edge handling information, function information used for generating the edge handling information, 3D image processing information and/or the aforementioned information and the like.

The output formatter 13120 formats a 3D image of each viewpoint on which edge handling is performed in an output form and displays the 3D image.

As mentioned in the foregoing description, the present invention proposes a method of organizing and utilizing various variables and data necessary for making environment providing an appropriate depth by applying an edge handling method to a viewpoint in which edge violation occurs according to each 3D image in a multi-view 3DTV.

According to the present invention, in case of watching a multi-view 3D image, it is able to handle an edge violation in each viewpoint.

According to the present invention, it is able to perform edge handling on a 3D image of a viewpoint not transmitted by a transmitting end.

According to the present invention, a receiver can perform edge handling although information (edge violation information) necessary for performing the edge handling is not provided by a transmitting end.

The method according to the present invention can be implemented in a form of a program command capable of being performed via various computer means and can be recorded in a media readable by a computer.

The media readable by the computer may include a program command, a data file, a data structure and the like independently or combination thereof. The program command recorded in the media may correspond to program command specially designed and configured for the present invention or a usable computer software publicly known to those who skilled in the related art. The examples of the recording media readable by the computer may include a hard disk, a floppy disc, a magnetic media such as a magnetic tape, an optical media such as a CD-ROM and a DVD, a magneto-optical media such as a floptical disk, a ROM, a RAM, a flash memory and the like specially configured to store and perform a program command. The examples of the program command include not only a machine language code made by a compiler but also a high level language code implementable by a computer using an interpreter and the like. The aforementioned hardware device can be configured to work by one or more software modules to perform operations of the present invention and vice versa.

While the present invention has been described and illustrated herein with reference to the preferred embodiments thereof, it may be non-limited to the aforementioned specific embodiment and it will be apparent to those skilled in the art that various modifications and variations can be made therein without departing from the spirit and scope of the invention. Thus, it is intended that the technical idea and prospect of the present invention covers the modifications and variations of this invention.

MODE FOR INVENTION

As mentioned in the foregoing description, items related to the present invention have been described in the best mode of the present invention.

INDUSTRIAL APPLICABILITY

The present invention can be used in a digital broadcasting industry field in whole or in part.

What is claimed is:

1. A method of receiving a multi-view 3D image broadcast signal, which processes edge violation in a multi-view 3D image, comprising the steps of:

receiving a broadcast signal for a multi-view 3D image broadcasting;

decoding a first left image data and a first right image data contained in a 3D image of a first viewpoint from the received broadcast signal;

parsing 3D image processing information from the received broadcast signal;

generating at least one or more data among a second left image data and a second right image data contained in a 3D image of a second viewpoint using the first left image data, the first right image data and the 3D image processing information;

parsing 3D edge violation area detection function information contained in the 3D image processing information;

extracting an area of edge violation occurring in the 3D image of the second viewpoint using the 3D edge violation area detection function information and handling the edge violation of the area; and displaying the 3D image of the first viewpoint and the 3D image of the second viewpoint.

2. The method of claim 1, wherein the 3D edge violation area detection function information comprises function type information identifying a type of a function used for extracting the area of the edge violation and coefficient information indicating a coefficient value used for an identified function.

3. The method of claim 2, wherein the 3D image processing information further comprises location information of a camera expected to capture the second left image and the second right image and information indicating an edge violation area of the 3D image of the first viewpoint.

4. The method of claim 1, wherein the 3D image processing information further comprises edge handling information containing information on edge violation capable of being occurred in a 3D image of one or more viewpoints generated by a receiver.

5. The method of claim 4, wherein the edge handling information comprises information on the number of pixels of an area of edge violation existing in a left image contained in the 3D image of the at least one or more viewpoints and information on the number of pixels of an area of edge violation existing in a right image contained in the 3D image of the at least one or more viewpoints.

6. The method of claim 5, wherein the edge handling information further comprises information designating a method of handling the edge violation existing in the left image and the right image contained in the 3D image of the at least one or more viewpoints.

7. The method of claim 6, wherein the edge handling information further comprises information identifying a minimum disparity of the 3D image of the at least one or more viewpoints after the edge violation existing in the left image and the right image contained in the 3D image of the at least one or more viewpoints is handled.

8. The method of claim 7, wherein the 3D image processing information is transmitted via an SEI (supplemental enhancement information) message.

9. The method of claim 7, wherein the 3D image processing information is transmitted via a PMT (program map table), a VCT (virtual channel table), an EIT (event information table) or an SDT (service description table).

10. A method of receiving a multi-view 3D image broadcast signal, which processes edge violation in a multi-view 3D image, comprising the steps of:

receiving a broadcast signal for a multi-view 3D image broadcasting;

decoding a first left image data and a first right image data contained in a 3D image of a first viewpoint from the received broadcast signal;

parsing 3D image processing information from the received broadcast signal;

generating at least one or more data among a second left image data and a second right image data contained in a 3D image of a second viewpoint using the first left image data, the first right image data and the 3D image processing information, wherein the step of generating the at least one or more data among the second left image data and the second right image data contained in the 3D image of the second viewpoint comprises the steps of mapping pixels contained in the 3D image of the first viewpoint to the 3D image of the second viewpoint and extracting an area of edge violation occurring in the 3D image of the second viewpoint from the mapping process;

handling the edge violation of the 3D image of the second viewpoint; and displaying the 3D image of the first viewpoint and the 3D image of the second viewpoint.

11. The method of claim 10, wherein the 3D image processing information comprises information on a camera parameter of a camera capturing the 3D image of the first viewpoint and wherein the step of generating the at least one or more data among the second left image data and the second right image data contained in the 3D image of the second viewpoint generates the at least one or more data among the second left image data and the second right image data contained in the 3D image of the second viewpoint using the information on the camera parameter.

12. The method of claim 10, wherein the step of extracting the area of the edge violation occurring in the 3D image of the second viewpoint respectively detects pixels contained in a left image and a right image of the 3D image of the second viewpoint and detects an area in which a pixel exiting in the left image while not existing in the right image or a pixel existing in the right image while not existing in the left image is contained as the area of the edge violation.

* * * * *